(12) United States Patent
Kazuyuki

(10) Patent No.: US 11,082,616 B2
(45) Date of Patent: Aug. 3, 2021

(54) OVERLOOKING IMAGE GENERATION SYSTEM FOR VEHICLE AND METHOD THEREOF

(71) Applicants: Hyundai Motor Company, Seoul (KR); Kia Motors Corporation, Seoul (KR)

(72) Inventor: Hamada Kazuyuki, Kanagawa (JP)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/591,157

(22) Filed: Oct. 2, 2019

(65) Prior Publication Data

US 2020/0120273 A1    Apr. 16, 2020

(30) Foreign Application Priority Data

Oct. 16, 2018  (JP) .............. JP2018-195310

(51) Int. Cl.
*H04N 5/232*  (2006.01)
*G06T 7/292*  (2017.01)
(Continued)

(52) U.S. Cl.
CPC ......... *H04N 5/23238* (2013.01); *G06T 7/292* (2017.01); *G06T 7/33* (2017.01);
(Continued)

(58) Field of Classification Search
CPC .... H04N 5/23238; H04N 5/247; H04N 5/272; H04N 5/2628; H04N 5/265; H04N 7/181; H04N 5/232; G06T 7/292; G06T 7/33; G06T 2207/20221; G06T 2207/30252; G06T 2207/30241; G06T 2207/30236; G06T 2200/32; H04W 4/40; H04W 4/44; H04W 4/46; H04W 4/02; H04W 4/024; H04W 4/029; B60K 2370/177;
(Continued)

(56) References Cited

U.S. PATENT DOCUMENTS

2015/0235398 A1*  8/2015  Kim .............. G06F 3/011
                                                        345/633
2019/0052842 A1*  2/2019  Du .............. G06K 9/00979

FOREIGN PATENT DOCUMENTS

JP  2010166196 A  7/2010
JP  2013133098 A  7/2013

* cited by examiner

*Primary Examiner* — James M Pontius
(74) *Attorney, Agent, or Firm* — Mintz Levin Cohn Ferris Glovsky and Popeo, P.C.; Peter F. Corless

(57) ABSTRACT

An overlooking image generation system for a vehicle is provided to confirm the traffic situation around a subject vehicle. The system includes an overlooking image generation device that generates a wide-area overlooking image capable to confirm traveling situations of a subject vehicle and a nearby vehicle. A display device displays the wide-area overlooking image. The overlooking image generation device acquires captured image signals of other vehicles including a plurality of captured images by communicating with the other vehicles using V2X, generates the wide-area overlooking image including the subject vehicle and the nearby vehicle by image-synthesizing the acquired captured image signals of the other vehicles, and displays the generated wide-area overlooking image including the subject vehicle and the nearby vehicle on the display device.

16 Claims, 7 Drawing Sheets

(51) Int. Cl.
  *H04N 5/247*   (2006.01)
  *H04N 5/272*   (2006.01)
  *H04N 5/262*   (2006.01)
  *H04N 5/265*   (2006.01)
  *H04W 4/40*   (2018.01)
  *G06T 7/33*    (2017.01)

(52) U.S. Cl.
  CPC .............. *H04N 5/247* (2013.01); *H04N 5/265* (2013.01); *H04N 5/2628* (2013.01); *H04N 5/272* (2013.01); *H04W 4/40* (2018.02); *G06T 2207/20221* (2013.01); *G06T 2207/30236* (2013.01); *G06T 2207/30241* (2013.01); *G06T 2207/30252* (2013.01)

(58) Field of Classification Search
  CPC ...... B60K 2370/5915; B60K 2370/592; B60K 2370/176; B60K 2370/21; B60K 35/00
  See application file for complete search history.

○ INDICATES CAMERA

OVERLOOKING IMAGE GENERATION SYSTEM FOR VEHICLE AND METHOD THEREOF

CROSS-REFERENCE TO RELATED APPLICATION

This application claims under 35 U.S.C. § 119(a) the benefit of priority to Japanese Patent Application No. 2018-195310 filed on Oct. 16, 2018, the entire contents of which are incorporated herein by reference.

BACKGROUND

(a) Technical Field

The present disclosure relates to an overlooking image generation system for a vehicle and a method thereof, and more particularly, to an overlooking image generation system for a vehicle and a method thereof, which generate an overlooking image from any viewpoint such as a high position, front, rear, and side positions using the viewpoint switching.

(b) Background Art

A developed technique of the related art discloses synthesizing images obtained by capturing with a plurality of cameras installed on the front, rear, left, and right sides of the subject vehicle, and switching them into the overlooking images that are viewed from the viewpoint over the vehicle. For example, it is shown that the parking assistance is performed by switching the front, rear, left, and right surroundings of the subject vehicle including some or all of them into an image of a top view that may be seen at a glance and displaying the image on a display.

In addition, another developed technique teaches that the images captured by the front, rear, left, and right cameras and a wide angle camera installed on a roof are synthesized into one image to perform the operating assistance. This synthesizes the image of the far-sight camera, the image of the left camera, the image of the front camera, and the image of the right camera and displays them on the display. For example, in driving a vehicle on a narrow road forwardly, the left and right of the vehicle including the obstacles ahead of the subject vehicle may be confirmed.

However, all of the above-described conventional techniques display only a limited area around the subject vehicle, and are unable to display the surrounding situations other than the limited area. Accordingly, in spite of existing in a relatively close area of the subject vehicle, other vehicles approaching the subject vehicle, or the traffic situation around the subject vehicle including the relationship between the surrounding environment such as obstacles and road surface situation and the subject vehicle are unable to be accurately notified to a driver.

The above information disclosed in this section is merely for enhancement of understanding of the background of the disclosure and accordingly it can contain information that does not form the prior art that is already known in this country to a person of ordinary skill in the art.

SUMMARY

The present disclosure provides an overlooking image generation system for a vehicle and a method thereof, which may more accurately confirm the traffic situation around the subject vehicle.

According to one aspect, an overlooking image generation system for a vehicle may include an overlooking image generation device configured to generate a wide-area overlooking image capable of confirming the traveling situations of a subject vehicle and a nearby vehicle, and a display device configured to display the wide-area overlooking image thereon. Additionally, the overlooking image generation device may be configured to acquire captured image signals of other vehicles including a plurality of captured images by communicating with the other vehicles using vehicle to everything (V2X), generate the wide-area overlooking image including the subject vehicle and the nearby vehicle by image-synthesizing the acquired captured image signals of the other vehicles, and display the generated wide-area overlooking image including the subject vehicle and the nearby vehicle on the display device.

The overlooking image generation device may further be configured to generate the wide-area overlooking image displaying to allow the subject vehicle to be identified from the other vehicles by image-synthesizing the acquired captured image signals of the other vehicles to the captured image signal of the subject vehicle. The overlooking image generation device may be configured to extract the information related to the vehicle and the operation from the captured image signal of the subject vehicle and the acquired captured image signals of the other vehicles, and display by superimposing the information relating to the movement prediction of the nearby vehicle based on the extracted information related to the vehicle and the operation to the wide-area overlooking image.

Further, the overlooking image generation device may include an information signal receiving unit configured to acquire one or more of an information signal including navigation information of the subject vehicle and navigation information of the other vehicles acquired using the vehicle to everything (V2X) communication, and an information signal on a cloud via a communication device, and may be configured to output a display by processing the acquired information signal to superimpose the signal to the wide-area overlooking image.

The overlooking image generation device may be configured to perform the movement prediction of the other vehicles based on the acquired captured image signals of the other vehicles and the acquired information signal, and display the movement prediction of the other vehicles on the wide-area overlooking image. In addition, the overlooking image generation device may be configured to perform the movement prediction of the other vehicles based on the acquired captured image signals of the other vehicles and the acquired information signal, and display the information of the other vehicles deviated from the prediction on the wide-area overlooking image as a vehicle having unnatural behavior.

The overlooking image generation device may be configured to generate the overlooking images of other points or other viewpoint positions as the wide-area overlooking image by the user's operation. In addition, the overlooking image generation device may be configured to output the display by selecting the images of the other vehicles in the wide-area overlooking image based on the position information of a vehicle given in connection to the images of the other vehicles. The overlooking image generation device may be configured to perform the movement, zoom-in, and zoom-out display in the image range of the wide-area overlooking image by the user's operation.

Furthermore, the overlooking image generation device may be configured to acquire the captured image signals of the other vehicles by the image signal from a camera installed therein. The wide-area overlooking image and the information relating to the wide-area overlooking image may be provided to the other vehicles using the vehicle to everything (V2X) communication. Additionally, the wide-area overlooking image and the information relating to the wide-area overlooking image may be provided to an external electronic device connected via a communication device.

In order to achieve the object, an overlooking image generation system for a vehicle according to another aspect of the present disclosure may include an overlooking image generation device configured to generate a wide-area overlooking image capable of confirming the traveling situations of a subject vehicle and a nearby vehicle, and a display device configured to display the wide-area overlooking image thereon.

The overlooking image generation device may be configured to acquire a road captured image signal by communicating with a traffic monitoring camera installed on the road using vehicle to everything (V2X), generate the wide-area overlooking image including the subject vehicle and the nearby vehicle by image-processing the acquired road captured image signal, and display the generated wide-area overlooking image including the subject vehicle and the nearby vehicle on the display device. The overlooking image generation device may be configured to generate the wide-area overlooking image displaying to allow the subject vehicle to be identified from the other vehicles by image-synthesizing the acquired road captured image signal to the captured image signal of the subject vehicle.

In addition, a method for generating an overlooking image for a vehicle according to still another aspect of the present disclosure, as the method for generating the overlooking image of an overlooking image generation device in an overlooking image generation system for a vehicle including the overlooking image generation device and a display device may include acquiring captured images of the other vehicles including a plurality of captured images by communicating with the other vehicles using vehicle to everything (V2X) communication, generating a wide-area overlooking image displaying to allow a subject vehicle to be identified from the other vehicles by image-synthesizing the captured image signal of the subject vehicle and the acquired captured image signals of the other vehicles, and displaying the generated wide-area overlooking image on the display device.

A method for generating an overlooking image for a vehicle according to yet another aspect of the present disclosure, as the method for generating the overlooking image of an overlooking image generation device in an overlooking image generation system for a vehicle including the overlooking image generation device and a display device, may include acquiring a road captured image signal by communicating with a traffic monitoring camera installed on the road using vehicle to everything (V2X) communication, generating a wide-area overlooking image displaying to allow a subject vehicle to be identified from the other vehicles by image-synthesizing the captured image signal of the subject vehicle and the acquired road captured image signal, and displaying the generated wide-area overlooking image on the display device.

According to the overlooking image generation system for the vehicle of the present disclosure, it may be possible to generate a wide-area overlooking image capable of identifying the traveling situation of the vehicle based on the captured image signal of the cameras mounted on the subject vehicle and other vehicles, thereby confirming the traffic situation around the subject vehicle accurately. For example, it may be possible to more easily perform a lane change, a right turn, a left turn, or the like, and particularly, it is effective in an arterial highway, a congested road, a complex intersection, a highway, and the like, which have many lanes, and may contribute to the accident prevention.

In addition, it may be possible to simultaneously monitor the images other than the surroundings of the subject vehicle, for example, the images ahead of the subject vehicle using a smart phone, or the like, while monitoring the overlooking image around the subject vehicle through the display device of the subject vehicle, and ultimately, it may be possible to monitor the road situation to the destination as the overlooking image along the route even without driving the subject vehicle. In addition, it may be possible to use the application capable of monitoring while moving the overlooking image using a scroll function of a smart phone or the like even without a specific destination.

BRIEF DESCRIPTION OF THE DRAWINGS

The above and other features of the present disclosure will now be described in detail with reference to exemplary embodiments thereof illustrated the accompanying drawings which are given herein below by way of illustration only, and thus are not limitative of the present disclosure, and wherein.

Figure 1:
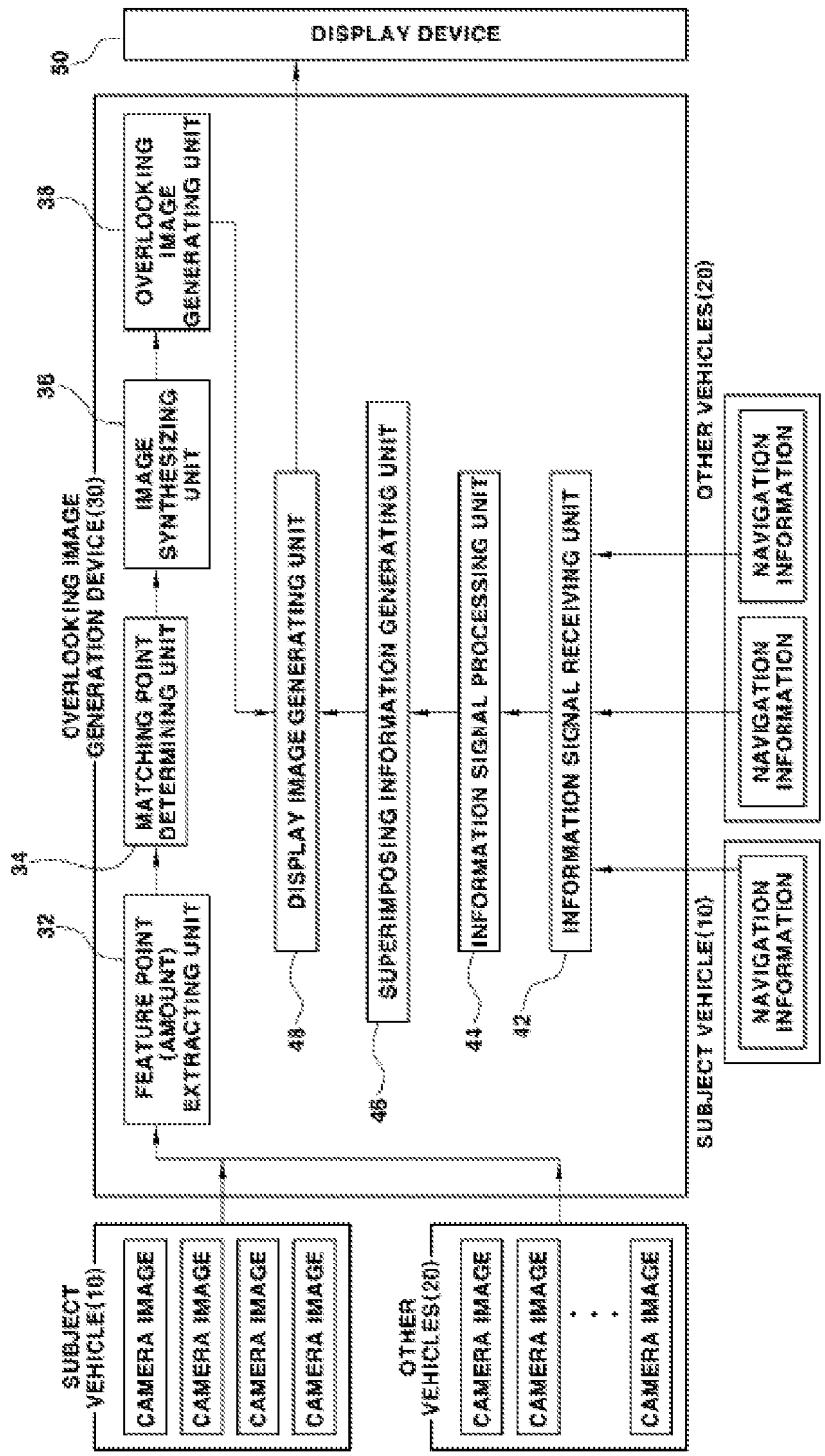
FIG. 1 is an overall block diagram illustrating an overlooking image generation system and the processing flow thereof using the camera images of an individual vehicle according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a specific example of embodying an overlooking image generation system for a vehicle and a method thereof according to the present disclosure will be described in detail with reference to the drawings.

Generally, Vehicle to Everything (V2X) refers to all of Vehicle to Network (V2N), Vehicle to Vehicle (V2V), Vehicle to Roadside Infrastructure (V2I), and Vehicle to Pedestrian (V2P), and the V2X is under development that communicates with the device installed on the road or a smart phone owned by a pedestrian as well as between the vehicles as a wireless communication technology for a vehicle such as a vehicle together with the proceeding of the gigabyte communication technology by a fifth generation (5G) wireless mobile telecommunication or the technology development of the autonomous vehicle.

Figure 2:
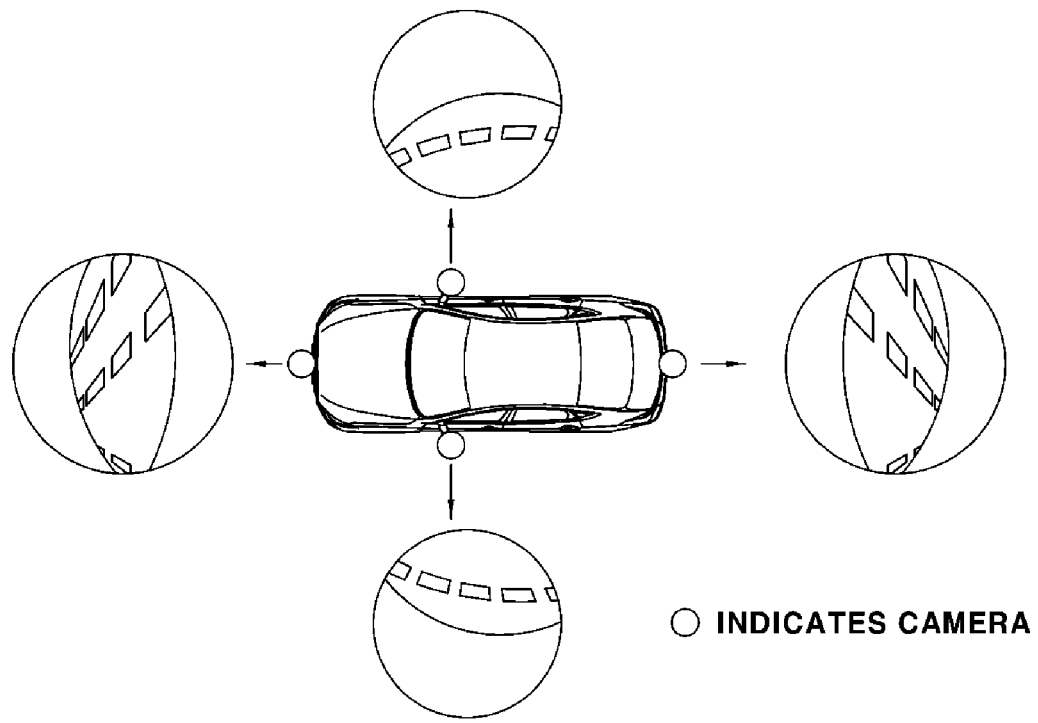
FIG. 2 is a diagram illustrating the position of a camera installed on the subject vehicle to generate the AVM images and the captured images thereof conventionally according to the related art.

FIG. 1 is an overall block diagram illustrating an overlooking image generation system and the processing flow thereof using the camera images of an individual vehicle according to an exemplary embodiment of the present disclosure, and FIG. 2 is a diagram illustrating the position of a camera installed on the subject vehicle to generate the around view monitor (AVM) images and the captured images thereof conventionally according to the related art.

Referring to FIG. 1, an overlooking image generation system may include a subject vehicle 10 ("subject vehicle" in FIG. 1), a plurality of other vehicles 20 ("other vehicles" in FIG. 1) disposed around the subject vehicle, an overlooking image generation device 30, and a display device 50. The subject vehicle 10 may include devices necessary for operating the overlooking image generation system, for example, a plurality of cameras or other imaging devices disposed at the front, rear, left, and right sides of the vehicle, and configured to acquire the captured image of the surroundings thereof including the subject vehicle 10 and the other vehicles 20 and provide the acquired captured image to the overlooking image generation device 30.

Herein, the other vehicles 20 may be a vehicle, other than the subject vehicle 10, or may be a plurality of vehicles in the vicinity of the subject vehicle 10. The other vehicles 20 may be previously connected to the overlooking image generation system, may be configured to communicate with the overlooking image generation device 30 using V2X, acquire the captured image of the surroundings including the other vehicles 20 from the device necessary for operating the overlooking image generation system, for example, a plurality of cameras provided at the front, rear, left, and right sides of the vehicle based on the request from the overlooking image generation device 30 like the subject vehicle 10, and provide the acquired captured image to the overlooking image generation device 30.

The camera mounted in the subject vehicle 10 or the other vehicles 20 may be, for example, an around view monitor (AVM) camera for parking assistance as illustrated in FIG. 2, and the image captured by the AVM camera may be used in the present disclosure. In addition, the camera provided in the vehicle is not limited to the AVM camera of FIG. 2, and may be any imaging device mounted in the vehicle, such as a camera installed for the maintenance of the headway distance, a camera installed for automatic braking, or a camera of a drive recorder.

The overlooking image generation device 30 may include a feature point (amount) extracting unit 32, a matching point determining unit 34, an image synthesizing unit 36, an overlooking image generating unit 38, an information signal receiving unit 42, an information signal processing unit 44, an superimposing information generating unit 46, and a display image generating unit 48. In particular, the overlooking image generation device 30 may be installed in a vehicle navigation device or the like of the subject vehicle 10 or may include hardware and software such as a personal computer (PC) or workstation installed in a server (not illustrated) of a cloud connected via wireless communication provided in the subject vehicle 10.

The feature point (amount) extracting unit 32 may be configured to search a corresponding point using a feature amount extracting method, which will be described later with reference to FIG. 8, to extract the feature point (amount). The matching point determining unit 34 may be configured to determine a matching point between the image signals using the corresponding point extracted by the corresponding point search, which will be described later with reference to FIG. 8. The image synthesizing unit 36 may be configured to synthesize the image signals using the result of the matching point determining unit 34.

The overlooking image generating unit 38 may be configured to perform the viewpoint switching of the image after the image synthesizing process to generate an overlooking image. In addition, the processing such as changing the position information of the overlooking image, changing the viewpoint position, or enlarging or reducing may be performed according to the user's operation. The vehicle displayed as the overlooking image may be selected in the required range based on the position information of global positioning system (GPS) of the vehicle provided as the information related to the captured image acquired from the vehicle.

The information signal receiving unit 42 may be configured to receive a signal of the operation related information such as the position information by GPS, or the like, a vehicle speed, steering angle information, navigation information, acceleration, brake, a direction indicator, and the like together with the vehicle-related information such as the appearance relating to the vehicle from the vehicle navigation devices mounted in the subject vehicle and the other vehicles. The information signal processing unit 44 may then be configured to integrate the information signal obtained by the information signal receiving unit 42 and convert the information into assistance information for driving the subject vehicle.

The superimposing information generating unit 46 may be configure to generate superimposing information for clearly displaying the information processed by the information signal processing unit 44 on the overlooking image. In addition, the superimposing information generating unit 46 may be configured to change the information superimposed on the overlooking images based on the user's operation. The display image generating unit 48 may be configured to convert the image generated by the overlooking image generating unit 38 and the superimposing information generated by the superimposing information generating unit 46 into a signal displayed as a display image and provide the image displayed on the display device 50.

The display device 50 may be a display device mounted within a vehicle navigation device, a drive recorder, a rearview mirror mounted in the subject vehicle 10, or a display device provided in an electronic device having a wireless communication device such as a smart phone connected by a near-field wireless communication within the vehicle navigation device or the like or a wireless communication device via a server of a cloud. When the overlooking image generation device 30 is provided in the cloud, the change in the position information such as the location and the range of the overlooking image of a target vehicle, the change in the viewpoint position, and the enlargement/reduction display may be performed by a personal computer (PC) of the home or office as well as a smart phone at a visiting location (e.g., ma be performed remotely).

Although not illustrated, the overlooking image generation system may include an input such as a touch panel or a voice recognition device, a controller configured to operate each component, a storage such as a flash memory or an SSD, a wired and wireless communication device in communication with the outside by near-field wireless communication, portable phone communication network, internet, or the like, a connecting device with an on-vehicle unit including various sensors, and the like.

Figure 3:
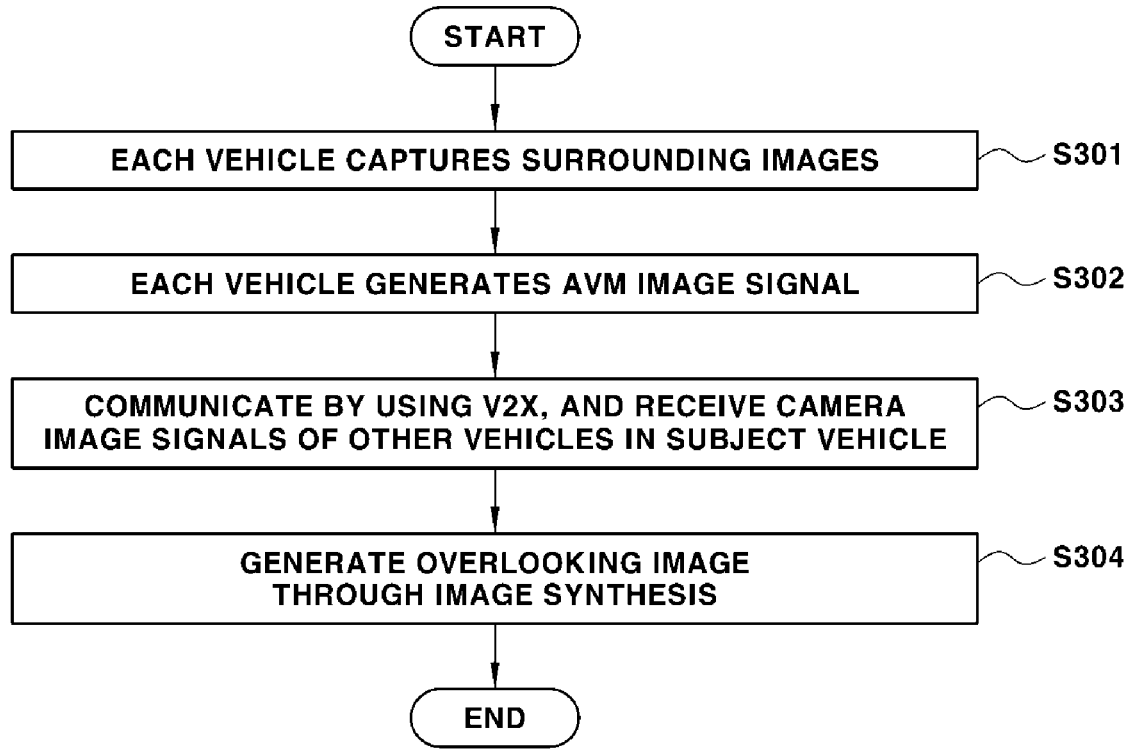
FIG. 3 is a flowchart illustrating the overlooking image generation using the camera images of the individual vehicle according to an exemplary embodiment of the present disclosure.

FIG. 3 is a flowchart illustrating overlooking image generation using the camera image of an individual vehicle according to an exemplary embodiment of the present disclosure. A plurality of vehicles (e.g., the subject vehicle 10 and the other vehicles 20) being driven on the road may be configured to capture the front, rear, left, and right surroundings including itself using an in-vehicle camera mounted in the vehicle, respectively. For example, the AVM camera may be configured to acquire a camera image signal S301, and generate an AVM image signal from the captured camera image signal of the front, rear, left, and right surroundings S302.

The subject vehicle 10 may be configured to communicate with a plurality of vehicles (other vehicles 20) traveling around or in the vicinity of the subject vehicle using the V2X, and may be configured to receive the AVM image signal from each vehicle (other vehicles 20) to install or download the image in the subject vehicle 10. Alternatively, instead of the generated AVM image signal, the captured image signal of the front, rear, left, and right surroundings captured by the camera may be received by the subject vehicle 10 and installed or downloaded in the overlooking image generation device 30 of the subject vehicle 10 S303.

The captured image signal of the plurality of vehicles (other vehicles 20) provided to the subject vehicle 10 is subject to the viewpoint switching and the image synthesis to generate a wide-area overlooking image viewed over the subject vehicle or from the rear including the subject vehicle by the feature point (amount) extracting unit 32, the matching point determining unit 34, the image synthesizing unit 36, the overlooking image generating unit 38, and the display image generating unit 48 of the overlooking image generation device 30 S304. The generated wide-area overlooking image may be provided to the display device such as a navigation device of the subject vehicle, a smart phone connected to near-field wireless communication, or a PC on the cloud connected to the Internet.

In addition to the captured image signal of the camera, the overlooking image generation device 30 may be configured to receive the signal of the operation-related information such as the vehicle-related information, the position information by GPS or the like related to the captured image, a vehicle speed, steering angle information, navigation information, an accelerator, a brake, a direction indicator, and the like, from the vehicle navigation device, or the like mounted in the subject vehicle and the other vehicles in the information signal receiving unit 42, and display by superimposing the signal to the wide-area overlooking image by the information signal processing unit 44, the superimposing information generating unit 46, and the display image generating unit 48. The necessary information among the information superimposed to the wide-area overlooking image may be selected by the user's operation.

The information installed in the overlooking image generation device 30 may include an image signal of the monitoring camera installed extraneously, a road captured image signal of a traffic monitoring camera installed on the road, which will be described below, or the like as an information signal on the cloud via other communication means and an infrastructure (hereinafter, referred to as "infra") information signal, in addition to the information from the vehicle such as the camera captured image signals of the subject vehicle 10 and the other vehicles 20 and the navigation information of the subject vehicle 10 and the other vehicles 20.

Figure 4:
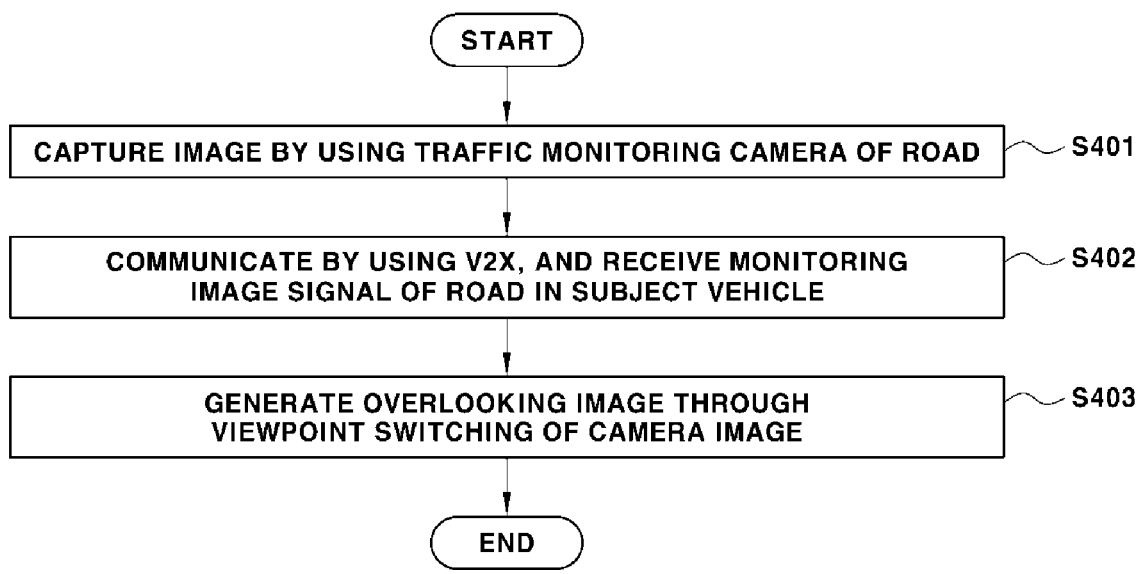
FIG. 4 is a flowchart illustrating the overlooking image generation using the traffic monitoring camera installed on the road according to an exemplary embodiment of the present disclosure.

FIG. 4 is a flowchart illustrating overlooking image generation using the traffic monitoring camera installed on the road according to an exemplary embodiment of the present disclosure. In the present embodiment, the traffic monitoring camera installed over the road may be assumed as an infra information signal. Explanations overlapping with those described in FIG. 3 will be briefly described or omitted. The traffic monitoring camera installed over the road may be configured to capture the traveling vehicle on the road to acquire the camera image signal S401.

The subject vehicle 10 may be configured to communicate with the traffic monitoring camera installed over the road using the V2X, receive a monitoring image signal of a traveling vehicle captured from the traffic monitoring camera to install or download the captured image in the required range in the overlooking image generation device 30 of the subject vehicle 10 S402. The monitoring image signal of the traffic monitoring camera installed in the subject vehicle 10 is subject to the viewpoint switching and the image processing to generate the wide-area overlooking image viewed over the subject vehicle or from the rear including the subject vehicle by the feature point (amount) extracting unit 32, the matching point determining unit 34, the image synthesizing unit 36, the overlooking image generating unit 38, and the display image generating unit 48 of the overlooking image generation device 30 S403. The generated wide-area overlooking image may be provided to the display device such as a navigation device of the subject vehicle, a smart phone connected to near-field wireless communication, or a PC on the cloud connected to the Internet.

The information installed in the overlooking image generation device 30 may include other infra information signals such as the information signal on the cloud via other communication means and the image signal of the monitoring camera installed extraneously, in addition to the information from the vehicle such as the monitoring image signal of the subject vehicle 10 and the traffic monitoring camera and the navigation information of the subject vehicle 10.

Figure 5:
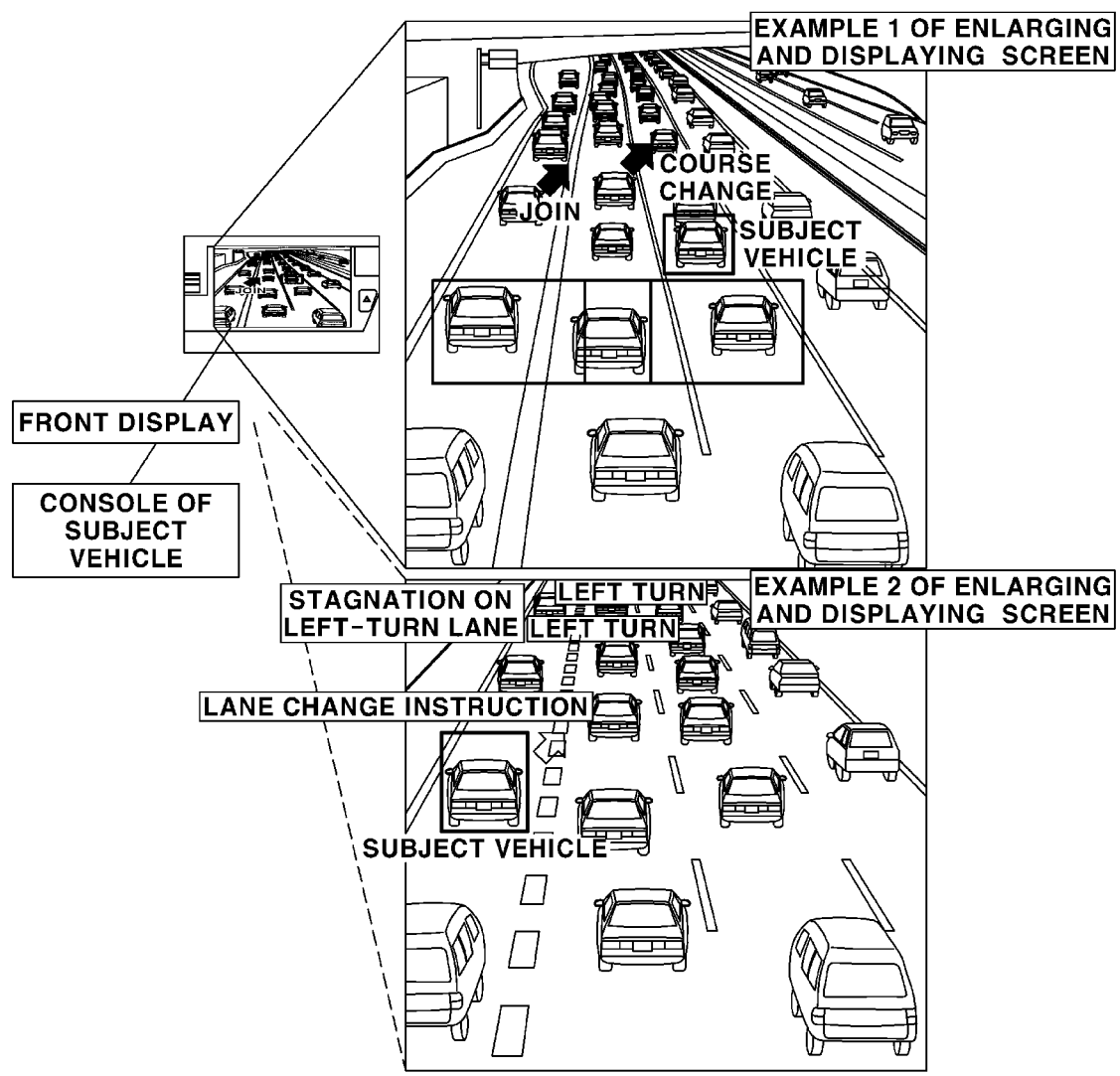
FIG. 5 is a diagram illustrating an example of the overlooking image according to an exemplary embodiment of the present disclosure.

FIG. 5 is a diagram illustrating an example of the overlooking image according to an exemplary embodiment of the present disclosure. FIG. 5 is an example of displaying the wide-area overlooking image including the subject vehicle 10 on a console of the vehicle by using a front display device such as a vehicle navigation device, and illustrates an example of enlarging the image on the upper right figure and the lower right figure. The user entering the subject vehicle 10 may confirm the movement of the other vehicles 20 by viewing the overlooking image from the high position and the rear position using the viewpoint switching. In addition, the user may confirm the moving situation of the nearby vehicle including the rear thereof by detecting the moving vector of the nearby vehicle by the camera captured information and the operation-related information of each vehicle or the information from the infra, and may also confirm the road situation ahead in advance.

For example, by displaying the forward image including the subject vehicle 10 from the rear of about 10 m from the subject vehicle 10, the entire situation of the surroundings thereof including the subject vehicle 10 may be confirmed using a bird's eye view, and the surrounding situation including the accessibility of the rear vehicle may also be confirmed. The overlooking image generation device 30 may be configured to adjust the overlooking position by the user's operation based on the driver's preference or the vehicle speed, such as displaying the distance from the front to the farther vehicle as the speed increases. For example, it may be possible to change the display range by interlocking with the direction indicator, and to widely display the image at the moving direction side or the rear image. In addition, it may be possible to adjust the angle of the ground display by the curved state of the road in cooperation with the map information of the vehicle navigation device or the like.

Various attribute information may be displayed as the information related to the overlooking image in the wide-area overlooking image. For example, referring to the overlooking images of the upper right figure and the lower right figure, the subject vehicle 10 may be displayed surrounded by a frame to distinguish from the other vehicles 20. The identification mark for distinguishing the subject vehicle 10 is not limited to being surrounded by a frame, and for example, highlight, flash, color change, other marking means, or the like may be used. In addition, by extracting the information relating to the vehicle and the operation from the captured image signal of the subject vehicle and the acquired captured image signals of the other vehicles, the information regarding the movement prediction of the nearby vehicle may be displayed on the wide-area overlooking image.

For example, from the image of the direction indicator of the vehicle as the acquired object, the vehicle to be joined and the vehicle execute lane change may be displayed together with the directions thereof in the upper right figure. In addition, by acquiring the information signal including the navigation information of other vehicles using the V2X or the information signal on the cloud via the communication means to process various information signals, more detailed and more accurate information may be displayed on the wide-area overlooking image. For example, "the left turn lane is stagnated" may be displayed in the lower right figure, a plurality of vehicles to execute left turned may be displayed thereon. The overlooking image generation device 30 may be configure to determine that most vehicles ahead of the subject vehicle 10 have turned left and may be configured to display "lane change instruction" thereon to attempt to change the subject vehicle to the right lane.

Conventionally, the system is unable to determine whether there are many vehicles to execute left-turn ahead of the subject vehicle even when it wants to go straight, but the overlooking image generation device 30 may instruct the driver to change the traveling lane in advance when the subject vehicle 10 is traveling on the lane having many left-turn vehicles by cooperating with the V2X and the vehicle navigation device.

It may be possible to estimate and display the movement of such a vehicle by collecting the operation-related information such as the lane change of the vehicle from the navigation information of the other vehicles 20. In addition, when a small vehicle such as a motorcycle is hidden by a large vehicle due to road stagnation or the like, it may be possible to synthesize a past image on the square of the hidden part, thereby clearly seeing the hidden square together with implementing the supplementary display.

The above-described attribution information displayed on the wide-area overlooking image may add by extracting the information on the captured image, for example, an empty space between the vehicles, from the captured image signals of the subject vehicle 10 and the other vehicles 20 to superimpose it so that the vehicle is not hidden. Alternatively, the superimposing space may be extracted based on the information such as the vehicle appearance of the subject vehicle 10 and the other vehicles 20, or the operation-related information such as position information, a vehicle speed, navigation information, and a turn signal.

A user of passenger seat or a rear seat may freely change and view an image while monitoring the overlooking image around the subject vehicle with the display device such as the vehicle navigation device of the subject vehicle 10 in connection with a smart phone, and a plurality of users may monitor the operating situation at various angles or various viewpoints. In addition, it may be possible to simultaneously monitor the images other than the surroundings of the subject vehicle, for example, an image of 100 meters ahead of the subject vehicle, or a further ahead image using a smart phone or the like, and ultimately, it may be possible to also monitor the road situation to the destination as the overlooking image along the route even without driving the subject vehicle. It may further be possible to use the application monitoring while moving the overlooking image using the scroll function of a smart phone or the like even without a specific destination.

Even for the vehicle that does not include the overlooking image generation system for the vehicle of the present disclosure, it may be possible to provide the other vehicles 20 with the overlooking image used in the subject vehicle 10 using the V2X, thereby widely contributing to providing the information for safe driving. In addition, it may be possible to save the above-mentioned overlooking image on the cloud, thereby confirming the accident situation, and in addition to the accident, it may also be possible for the road maintenance personnel to monitor the road situation, thereby applying it to the road maintenance work.

In addition, it may be possible to read the forward license plate to specify and display the warning vehicle from the information relating to the past operating situation based on the license plate information using the information on the cloud such as big data and artificial intelligence (AI), and at the same time, to perform the navigation of assisting the operation based on the above information. When the overlooking image generation device 30 is installed in the server on the cloud, it may also be possible to display the overlooking image on which the traffic-related information has been superimposed with the traffic stagnation information on the large display for traffic information display installed on the infra such as over the road or beside the road.

Figure 6:
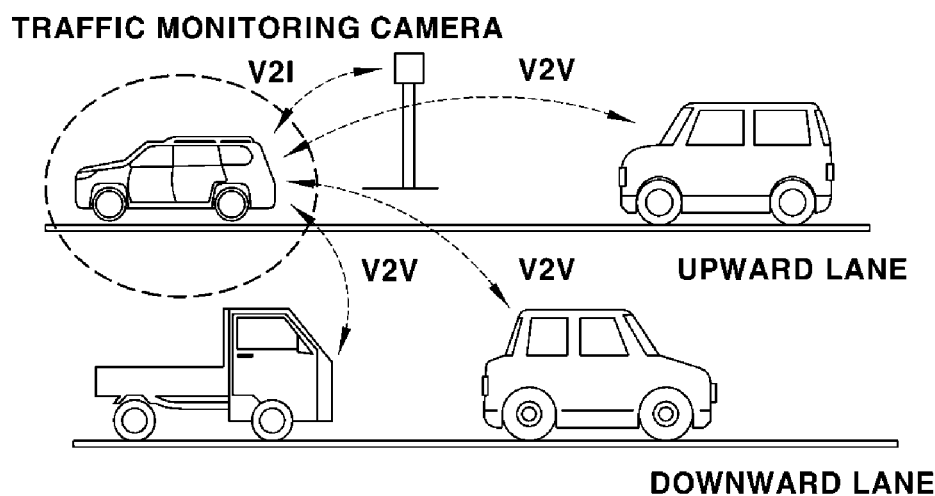
FIG. 6 is a diagram illustrating the communication situation between the traffic monitoring camera beside the road and the vehicle according to an exemplary embodiment of the present disclosure.
Figure 7:
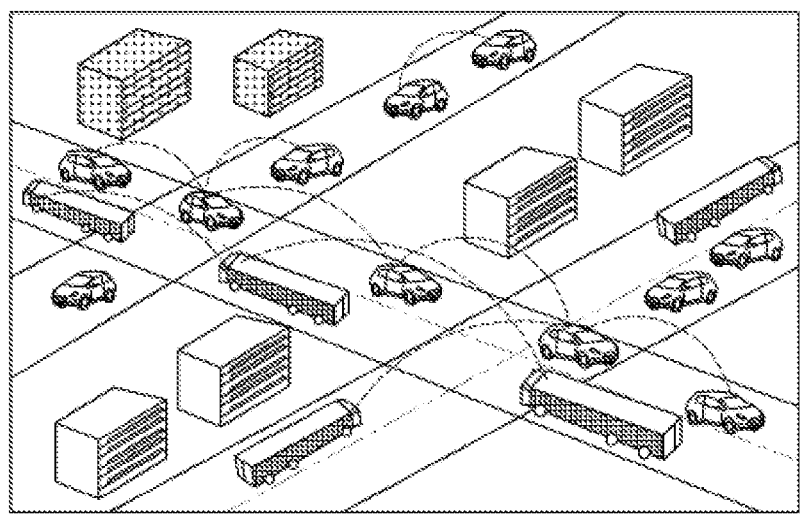
FIG. 7 is a diagram illustrating the communication situation between the vehicles according to an exemplary embodiment of the present disclosure.

FIG. 6 is a diagram illustrating the communication situation between the traffic monitoring camera beside the road and the vehicle according to an exemplary embodiment of the present disclosure, and FIG. 7 is a diagram illustrating the communication situation between the vehicles according to an exemplary embodiment of the present disclosure.

A method for specifying the position of the subject vehicle 10 and the positions of the other vehicles 20 will be described with reference to FIGS. 6 and 7. Each vehicle specifies position information using a GPS or the like provided in the vehicle navigation device. The position information of the subject vehicle 10 may be used to estimate the position on the road, and the position information of the other vehicles 20 may be acquired using the V2X and may be used to estimate the position on the road (e.g., the road on which each of the vehicles is located). When the GPS information is unable to be acquired, the position information may be supplemented using an on-vehicle sensor such as a gyro sensor, an acceleration sensor, or a light detection and ranging (LIDAR), a map matching technique, and the like. The overlooking image generation device 30 may be configured to acquire position information and a prediction progress direction from the vehicle navigation device, or the like of the subject vehicle 10 and the other vehicles 20 to superimpose it on the overlooking image displayed on the display device such as the vehicle navigation device and display the estimated prediction moving direction thereon.

As illustrated in FIG. 6, the overlooking image generation device 30 may be configured to receive and acquire the captured image signal of the camera of the subject vehicle 10, and communicate with the other vehicles 20 using the V2X (V2V) to receive and acquire the captured image signals of the cameras of other vehicles 20, or acquire the road captured image by communicating with infra facility such as the traffic monitoring camera installed on the road by using the V2X (V2I).

At this time, the overlooking image generation device 30 may be configured to simultaneously acquire the operation-related information such as the vehicle information of the subject vehicle 10 and the other vehicles 20, the position information, and the navigation information, and acquire various traffic-related information signals including the information of a multi-point infra facility from the cloud through the infra facility or another communication means. The overlooking image generation device 30 may be configured to generate the wide-area overlooking image by performing the image synthesis and the viewpoint switching of the captured image of a plurality of other vehicles 20, or generate the wide-area overlooking image subject to the viewpoint switching by performing the image processing of the road captured image acquired from the infra facility using the V2X (V2I). The information from the other vehicles 20 and the information from the infra facility are not limited to either one, and both information may also be used integrally.

The information superimposed on the overlooking image as illustrated in FIG. 5 will be further described. It may be possible to collectively store the operation-related information such as the vehicle-related information or the navigation information from the nearby vehicle by the V2X, the information from the infra facility by the V2X, the past stagnation information stored on the cloud, and the like as big data on the cloud, and to analyze the big data by using AI, and to display the image by acquiring the information suitable for the purpose to superimpose it on the overlooking image. For example, it may be possible to integrate the vehicle progress information such as a left-turn vehicle, a straight-ahead vehicle, a right-turn vehicle, and the like to instruct the straight-ahead vehicle to promptly change the course in order not to be slowed down by the deceleration of the left-turn vehicle and the right-turn vehicle, thereby preventing disturbances in traffic flow.

By further enumerating these applications, for example, when the occurrence of stagnation is predicted on the left traveling lane due to many left-turn vehicles, the vehicle on the left lane may be promptly instructed to pass the passing lane, and the nearby vehicle may also be instructed to join. For example, the straight-ahead vehicle may be instructed to travel the current lane (e.g., maintain current lane) even on the traffic information display board installed on the road. For example, by using the navigation information of each vehicle and the traveling history, the traveling route of the vehicle that does not issue the direction instruction may be estimated and the traveling route may be rapidly output.

For example, a vehicle deviated from the prediction may be displayed as a vehicle having unnatural behavior. When assumed that the other route that goes straight ahead and turns to the right reaches the destination more rapidly than when turning to the left, the case where not turning to the left becomes the eco operation, or the like, the route information may be displayed thereon to allow a driver to select a route option. For example, when the driver does not desire to change the route even in the stagnation situation, or when a user desires to use a new road by learning the preference of the driver's traveling route, the navigation may be performed according to the preference.

Figure 8:
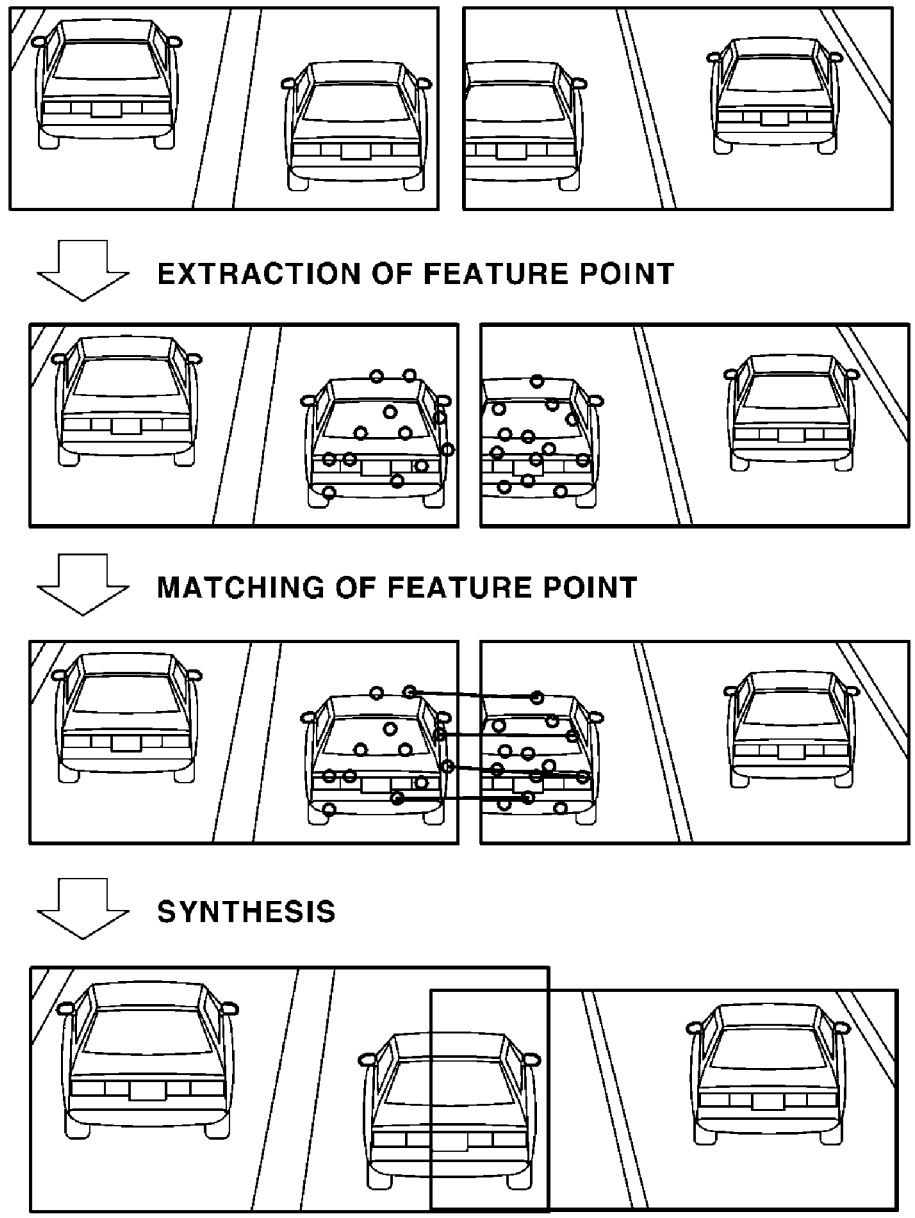
FIG. 8 is a diagram illustrating an example of the image synthesis by the feature point (amount) extraction according to an exemplary embodiment of the present disclosure.

FIG. 8 is a diagram illustrating an example of the image synthesis by extraction of the feature point (amount) according to an exemplary embodiment of the present disclosure. The overlooking image generation device 30 may be configured to input the captured image signal of the camera of the subject vehicle 10, the captured image signals of the cameras of the other vehicles 20 acquired using the V2X, and the road captured image signal from the infra facility such as the traffic monitoring camera acquired using the V2X to perform the corresponding point search between the images by the local feature amount corresponding to the feature amount detected for each image by the feature point (amount) extracting unit 32.

For each feature point extracted by the feature point (amount) extracting unit 32, the matching point determining unit 34 may be configured to perform the movement between the images using the corresponding point and the estimation of the change amount using the amount of movement between the images and the estimation of the projection conversion (homography) to perform the determination of the matching point with respect to each image. The image synthesizing unit 36 may be configured to perform the matching processing of the feature points using the movement and the change amount obtained by the matching point determining unit 34, and perform the blending processing of the pixel values of the respective images to synthesize to become a natural panorama image, thereby generating a synthesized image.

A detailed description of an algorithm for image recognition or image synthesis by extracting the feature amount and the feature point is understood by referring to known documents or materials. In the present specification, since there is a possibility that the subject matter of the present disclosure may be obscured, a method for extracting the feature amount will be briefly described below. As the feature amount, a Scale-Invariant Feature Transform (SIFT), a Speeded Up Robust Feature (SURF), an Accelerated KAZE (AKAZE), an Oriented FAST and Rotated BRIEF (ORB), and the like are known as the feature amount that is a robust feature amount that is strong against rotation, zoom-in•zoom-out, lighting change, and the like, and perform the extraction of the feature amount for using the image synthesis by using these.

For example, when the feature amount of the Scale-Invariant Feature Transform (SIFT) is used, the orientation of the key-point may be calculated by detecting a key-point (feature point) based on Hessian matrix and contrast, and obtains inclined information in the circle area in a Gaussian window with the scale having the key-point centered on the key-point by rotating the surrounding area in the orientation direction. For example, the surrounding area may be divided into a total of 16 blocks of four blocks per one side, an inclined directional histogram in eight directions (by 45 degrees) may be created for each block, and the histogram=4 blocks×4 blocks×8 directions=a feature vector of 128 dimensions is created. The length of each feature vector of the 128 dimensions may be normalized by the total sum of the vectors, and the feature amount that is strong against lighting change is acquired.

It may be possible to search the corresponding point between the images by comparing the feature amounts of the key-points extracted between the other images. It may also be possible to perform the image matching by searching the corresponding point using the SIFT feature amount, to search the corresponding point by calculating the distance of the feature amount of the key-point extracted between the two images, for example, to calculate an Euclidean distance between the SIFT feature amounts of 128 dimensions, and to set a smallest point of the calculated distance as the corresponding point.

As described above, although the exemplary embodiments of the present disclosure have been described in detail with reference to the drawings, the present disclosure is not limited to the above-described embodiments, and various modifications can be made without departing from the technical scope of the present disclosure.

What is claimed is:

1. An overlooking image generation system for a vehicle, comprising:
   an overlooking image generation device configured to generate a wide-area overlooking image capable of confirming traveling situations of a subject vehicle and a nearby vehicle; and
   a display device configured to display the wide-area overlooking image thereon,
   wherein the overlooking image generation device is further configured to:
   acquire captured image signals of other vehicles including a plurality of captured images by communicating with the other vehicles using vehicle to everything (V2X) communication,
   generate the wide-area overlooking image including the subject vehicle and the nearby vehicle by image-synthesizing the acquired captured image signals of the other vehicles,
   display the generated wide-area overlooking image including the subject vehicle and the nearby vehicle on the display device, and
   adjust an overlooking position displaying a distance from a front of the subject vehicle to the nearby vehicle as a speed of the subject vehicle increases.

2. The overlooking image generation system for the vehicle of claim 1, wherein the overlooking image generation device is configured to generate the wide-area overlooking image to distinguish the subject vehicle from the other vehicles by image-synthesizing the acquired captured image signals of the other vehicles to the captured image signal of the subject vehicle.

3. The overlooking image generation system for the vehicle of claim 1, wherein the overlooking image generation device is configured to:
   extract information related to the subject vehicle and an operation from the captured image signal of the subject vehicle and the acquired captured image signals of the other vehicles; and
   display the generated wide-area overlooking image by superimposing the information relating to a movement prediction of the nearby vehicle based on the extracted information related to the subject vehicle and the operation to the wide-area overlooking image.

4. The overlooking image generation system for the vehicle of claim 1, wherein the overlooking image generation device includes:

an information signal receiving unit configured to acquire one or more of an information signal including navigation information of the subject vehicle and navigation information of the other vehicles acquired using the vehicle to everything (V2X) communication, and an information signal on a cloud via a communication device, and display the generated wide-area overlooking image by processing the acquired information signal to superimpose the signal to the wide-area overlooking image.

5. The overlooking image generation system for the vehicle of claim 4, wherein the overlooking image generation device is configured to:

perform a movement prediction of the other vehicles based on the acquired captured image signals of the other vehicles and the acquired information signal; and perform the display of the movement prediction of the other vehicles on the wide-area overlooking image.

6. The overlooking image generation system for the vehicle of claim 4, wherein the overlooking image generation device is configured to:

perform a movement prediction of the other vehicles based on the acquired captured image signals of the other vehicles and the acquired information signal; and display the information of the other vehicles deviated from the prediction on the wide-area overlooking image as a vehicle having unnatural behavior.

7. The overlooking image generation system for the vehicle of claim 1, wherein the overlooking image generation device is configured to generate the overlooking images of other points or other viewpoint positions as the wide-area overlooking image by a user operation.

8. The overlooking image generation system for the vehicle of claim 1, wherein the overlooking image generation device is configured to display the generated wide-area overlooking image by selecting the images of the other vehicles in the wide-area overlooking image based on the position information of a vehicle given in connection to the images of the other vehicles.

9. The overlooking image generation system for the vehicle of claim 1, wherein the overlooking image generation device is configured to perform a movement, zoom-in, and zoom-out display in the image range of the wide-area overlooking image by a user operation.

10. The overlooking image generation system for the vehicle of claim 1, wherein the overlooking image generation device is configured to acquire the captured image signals of the other vehicles by the image signal from a camera installed on the vehicle.

11. The overlooking image generation system for the vehicle of claim 2, wherein the wide-area overlooking image and the information relating to the wide-area overlooking image are provided to the other vehicles using the vehicle to everything (V2X) communication.

12. The overlooking image generation system for the vehicle of claim 2, wherein the wide-area overlooking image and the information relating to the wide-area overlooking image are provided to an external electronic device connected via a communication device.

13. An overlooking image generation system for a vehicle, comprising:

an overlooking image generation device configured to generate a wide-area overlooking image to confirm traveling situations of a subject vehicle and a nearby vehicle; and a display device configured to display the wide-area overlooking image thereon, wherein the overlooking image generation device is further configured to:

acquire a road captured image signal by communicating with a traffic monitoring camera installed on a road on which the subject vehicle is being driven using vehicle to everything (V2X) communication, generate the wide-area overlooking image including the subject vehicle and the nearby vehicle by image-processing the acquired road captured image signal, display the generated wide-area overlooking image including the subject vehicle and the nearby vehicle on the display device, and adjust an overlooking position displaying a distance from a front of the subject vehicle to the nearby vehicle as a speed of the subject vehicle increases.

14. The overlooking image generation system for the vehicle of claim 13, wherein the overlooking image generation device is configured to generate the wide-area overlooking image displaying to distinguish the subject vehicle from the other vehicles by image-synthesizing the acquired road captured image signal to the captured image signal of the subject vehicle.

15. A method for generating an overlooking image for a vehicle, comprising as the method for generating the overlooking image of an overlooking image generation device in an overlooking image generation system for a vehicle including the overlooking image generation device and a display device:

acquiring, by a processor, captured images of other vehicles including a plurality of captured images by communicating with the other vehicles using vehicle to everything (V2X);

generating, by the processor, a wide-area overlooking image displaying to distinguish a subject vehicle from the other vehicles by image-synthesizing the captured image signal of the subject vehicle and the acquired captured image signals of the other vehicles;

displaying, by the processor, the generated wide-area overlooking image on the display device; and adjusting, by the processor, an overlooking position displaying a distance from a front of the subject vehicle to the nearby vehicle as a speed of the subject vehicle increases.

16. A method for generating an overlooking image for a vehicle, comprising as the method for generating the overlooking image of an overlooking image generation device in an overlooking image generation system for a vehicle including the overlooking image generation device and a display device:

acquiring, by a processor, a road captured image signal by communicating with a traffic monitoring camera installed on the road using vehicle to everything (V2X) communication;

generating, by the processor, a wide-area overlooking image displaying to distinguish a subject vehicle from the other vehicles by image-synthesizing the captured image signal of the subject vehicle and the acquired road captured image signal;

displaying, by the processor, the generated wide-area overlooking image on the display device; and adjusting, by the processor, an overlooking position displaying a distance from a front of the subject vehicle to the nearby vehicle as a speed of the subject vehicle increases.

* * * * *